(12) United States Patent
Ohta et al.

(10) Patent No.: US 7,221,839 B2
(45) Date of Patent: May 22, 2007

(54) OPTICAL FIBER WITH A LENS

(75) Inventors: Kazuyoshi Ohta, Yokohama (JP); Tomotake Yoshida, Tsukuba (JP)

(73) Assignee: Moritex Corporation, Tokyo (JP)

( * ) Notice: Subject to any disclaimer, the term of this patent is extended or adjusted under 35 U.S.C. 154(b) by 172 days.

(21) Appl. No.: 10/885,318

(22) Filed: Jul. 7, 2004

(65) Prior Publication Data

US 2005/0008310 A1    Jan. 13, 2005

(51) Int. Cl.
G02B 6/02    (2006.01)
(52) U.S. Cl. ......................................... 385/123; 385/33
(58) Field of Classification Search ............... 385/123, 385/33
See application file for complete search history.

(56) References Cited

U.S. PATENT DOCUMENTS 4,099,832 A * 7/1978 Warner, Jr. ................... 385/82
5,774,607 A * 6/1998 Shiraishi et al. ............... 385/33
6,130,972 A * 10/2000 Shiraishi et al. ............... 385/33
2001/0048782 A1* 12/2001 Teng et al. ..................... 385/11
2003/0165292 A1* 9/2003 Bhagavatula et al. ......... 385/33
2004/0126059 A1* 7/2004 Bhagavatula et al. ......... 385/33

FOREIGN PATENT DOCUMENTS

JP    2000-304965    * 11/2000

* cited by examiner

Primary Examiner—Frank G. Font
Assistant Examiner—James P. Hughes
(74) Attorney, Agent, or Firm—Townsend & Banta

(57) ABSTRACT

An optical fiber with a lens, obtained by fusion-coupling a multi-mode optical fiber to a tip of a single-mode optical fiber or polarization maintaining optical fiber, and working the tip of the multi-mode optical fiber, to form a spherical portion at the tip. In this case, the radius of curvature of the spherical portion is set to be larger than the maximum value of the expanded spot size. Furthermore, the length of the multi-mode optical fiber is set based on the correlation depending on said length and said radius of curvature for obtaining the minimum spot size at the focal position.

12 Claims, 5 Drawing Sheets

OPTICAL FIBER WITH A LENS

FIELD OF THE INVENTION

The present invention relates to an optical fiber with a lens.

BACKGROUND OF THE INVENTION

As one of the conventional means for coupling an optical device such as a semiconductor laser to an optical fiber or for coupling optical fibers to each other at a high coupling efficiency, an optical fiber with a lens is used.

The optical fiber with a lens can be a single-mode optical fiber or polarization maintaining optical fiber respectively directly worked at a tip of the optical fiber to form a spherical portion at the tip, or a multi-mode optical fiber or coreless fiber fusion-coupled to a tip of a single-mode optical fiber or polarization maintaining optical fiber and worked at the tip of the multi-mode optical fiber or coreless fiber to form a spherical portion at the tip, or the like.

For example, U.S. Pat. No. 5,774,607 describes an optical fiber with a lens, obtained by working a tip of a coreless fiber with an isotropic refractive index to have a spherical portion at the tip, and coupling the coreless fiber to a single-mode optical fiber using a multi-mode optical fiber. The length of the multi-mode optical fiber is set at the ¼ length of the meandering period of the sinusoidally propagating light or at an odd-number multiple of the ¼ length.

In this case, the meandering period of light in the multi-mode optical fiber is obtained by approximate calculation based on the values of core diameter, specific refractive index and the like on the assumption that the refractive index distribution is a perfect square distribution. One-fourth of the meandering period is called the ¼ length. The optical fiber with a lens obtained by using a multi-mode optical fiber with its length set at the ¼ length is disclosed in U.S. Pat. No. 6,130,972 and many other documents.

U.S. Pat. No. 5,774,607 also describes a single-mode optical fiber directly worked at a tip to have a spherical portion formed at the tip, as the prior art.

With regard to a single-mode optical fiber, for example in a typical case of using light with a wavelength of 1.55 μm, the spot size is as small as about 10.4 μm. So, in the case where the optical fiber is directly worked at a tip to form a spherical portion at the tip, such conditions as concentricity and shape accuracy during working for forming a spherical portion are severe, and it is inevitable that the focal distance becomes short, and that the working distance is as very short as, for example, about 5 μm. So, when it is coupled to an optical device or another optical fiber, it is very likely that they are caused to collide with each other in aligning work, etc.

On the other hand, in the case where a multi-mode optical fiber is coupled to a tip of a single-mode optical fiber and is worked to form a spherical portion at the tip of the multi-mode optical fiber, the meandering period of light is calculated approximately for setting the ¼ length on the assumption that the square distribution of refractive index continues infinitely toward outside. On the contrary, in an actual multi-mode optical fiber, the square distribution of refractive index extends finitely only up to the radius of the core, and a clad with a uniform refractive index exists outside the core. So, there occurs an approximation error compared with an actual case, and it is difficult to obtain the highest coupling efficiency.

As described above, in the prior art in which a multi-mode optical fiber is coupled to a tip of a single-mode optical fiber and is worked to form a spherical portion at the tip of the multi-mode optical fiber, it is the most important matter to set the length of the multi-mode optical fiber at the ¼ length in which the beam undulating and propagating in the optical fiber expands to the maximum extent, or at an odd-number multiple of the ¼ length. On the contrary, in this invention, the following matters are most important.

Without arriving at the ¼ length from the beginning, the inventors found that the following two matters are important when an optical fiber is coupled to an optical device such as a semiconductor laser or to another optical fiber using an optical fiber with a lens.

(1) The beam intensity distribution at the focal position (beam waist) of the beam condensed by an optical fiber with a lens is as close to a Gaussian distribution as possible.

(2) The beam spot sizes of the optical articles to be coupled to each other should agree with each other.

For forming an optical fiber with a lens satisfying the above-mentioned two important matters, the inventors found that it is necessary that the mode of the beam propagating in a multi-mode optical fiber coupled to a single-mode optical fiber or polarization maintaining optical fiber consists of the fundamental mode only and does not contain the excitation of higher modes or the leak mode propagating in the core-clad interface. They further found it necessary to have a forming method that allows the focal distance to be changed easily and freely, in order to make the spot size variable.

This invention has been completed based on the above-mentioned findings. An object of this invention is to solve the above-mentioned problems by fusion-coupling a multi-mode optical fiber to a tip of a single-mode optical fiber or polarization maintaining optical fiber, and working the tip of the multi-mode optical fiber to form a spherical portion at the tip. Another object of this invention is to reduce the aberration for enhancing the coupling efficiency by adequately setting the radius of curvature of the spherical portion formed at the tip of the multi-mode optical fiber and the length of the multi-mode optical fiber.

SUMMARY OF THE INVENTION

In this invention for achieving the above-mentioned objects, in claim 1 or 2, we propose an optical fiber with a lens, obtained by fusion-coupling a multi-mode optical fiber to a tip of a single-mode optical fiber or polarization maintaining optical fiber, and working the tip of the multi-mode optical fiber, to form a spherical portion at the tip.

Furthermore, in claim 3 or 4, we propose an optical fiber with a lens, according to claim 1 or 2, wherein the radius of curvature of the spherical portion is set at a value larger than the maximum value of the spot size of the single-mode optical fiber or polarization maintaining optical fiber magnified by the multi-mode optical fiber.

Still furthermore, in claim 5, we propose an optical fiber with a lens, as described above, wherein the length of the multi-mode optical fiber is set based on the correlation depending on said length and said radius of curvature, for obtaining the minimum spot size at the focal position.

Still furthermore, in claim 6, we propose an optical fiber with a lens, according to claim 5, wherein the correlation is derived from the data of the spot size at the focal position measured by changing the length at each radius of curvature, using the radius of curvature as a parameter.

Still furthermore, in claim 7 or 8, we propose an optical fiber with a lens, as described above, wherein the multi-mode optical fiber used has a core diameter of 50 μm or 65 μm and a clad diameter of 125 μm.

Still furthermore, in claim 9, we propose an optical fiber with a lens, according to claim 7, wherein the radius of curvature of the spherical portion is set at a value larger than 11 μm.

Still furthermore, in claim 10, we propose an optical fiber with a lens, according to claim 7, wherein the radius of curvature of the spherical portion is set based on the following correlation with the spot size of the beam incident on the multi-mode optical fiber and the spot size intended at the focal position.

$$R=69.5f/(222.7-f)$$

$$f=\pi\omega_0/\sqrt{\{(\omega_0/\omega_0')^2-1\}}$$

where $\omega_0$: spot size of the beam incident on the multi-mode optical fiber, $\omega_0'$: spot size intended at the focal position, R: radius of curvature of the spherical portion.

Still furthermore, in claim 11, we propose an optical fiber with a lens, according to claim 7, wherein the length of the multi-mode optical fiber is set based on the following correlation.

$$Lgif=334+R$$

where Lgif: length of the multi-mode optical fiber (μm), R: radius of curvature (μm).

According to this invention, the meandering characteristics of a beam by a multi-mode optical fiber coupled to a tip of a single-mode optical fiber or polarization maintaining optical fiber are used to expand the beam diameter, and the tip of the multi-mode optical fiber is worked to form a spherical portion at the tip, allowing the focal distance to be elongated without changing the numerical aperture (NA), thereby allowing the working distance to be elongated.

Thus, this invention can provide an optical fiber with a lens reduced in the occurrence of aberration and having a high coupling efficiency.

DETAILED DESCRIPTION OF THE PREFERRED EMBODIMENT

The detail of this invention is described below as an example in reference to the attached drawings.

Figure 1:
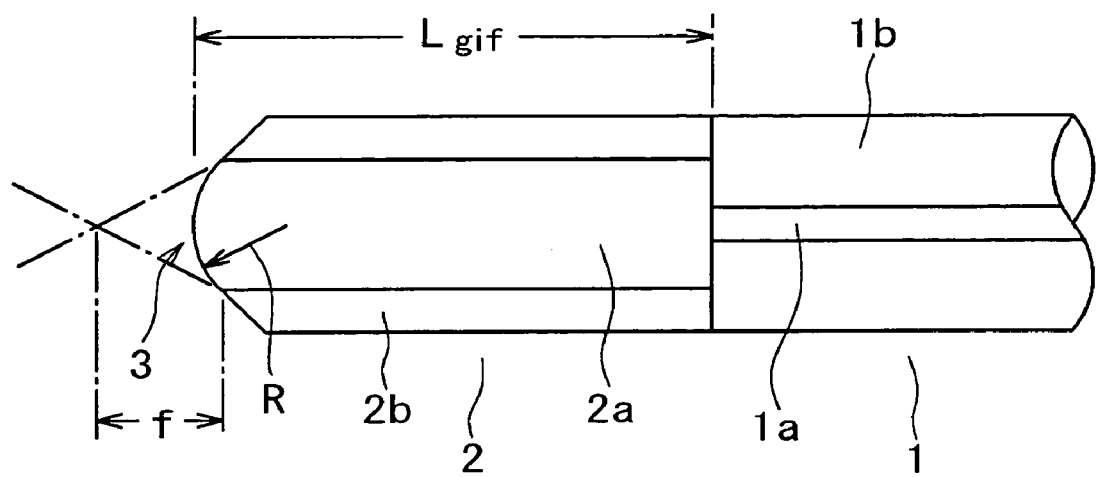
FIG. 1 is a conceptual illustration showing the constitution of the optical fiber with a lens of this invention.

FIG. 1 is a conceptual illustration showing the constitution of the optical fiber with a lens of this invention. Symbol 1 denotes a single-mode optical fiber or polarization maintaining optical fiber, and a multi-mode optical fiber 2 is fusion-coupled to a tip of the optical fiber 1. The tip of the multi-mode optical fiber 2 is worked to form a spherical portion 3 at the tip. Symbols 1a and 2a respectively denote a core, and 1b and 2b, a clad.

The methods for setting the length Lgif of the multi-mode optical fiber 2 of the optical fiber with a lens and the radius of curvature R of the spherical portion 3 at the tip are described below together with the reasons why the above-mentioned effects can be exhibited.

First of all, for elongating the working distance of the above-mentioned optical fiber with a lens, it is necessary to expand the spot size of the beam propagating in the multi-mode optical fiber 2 at the tip.

Figure 2:
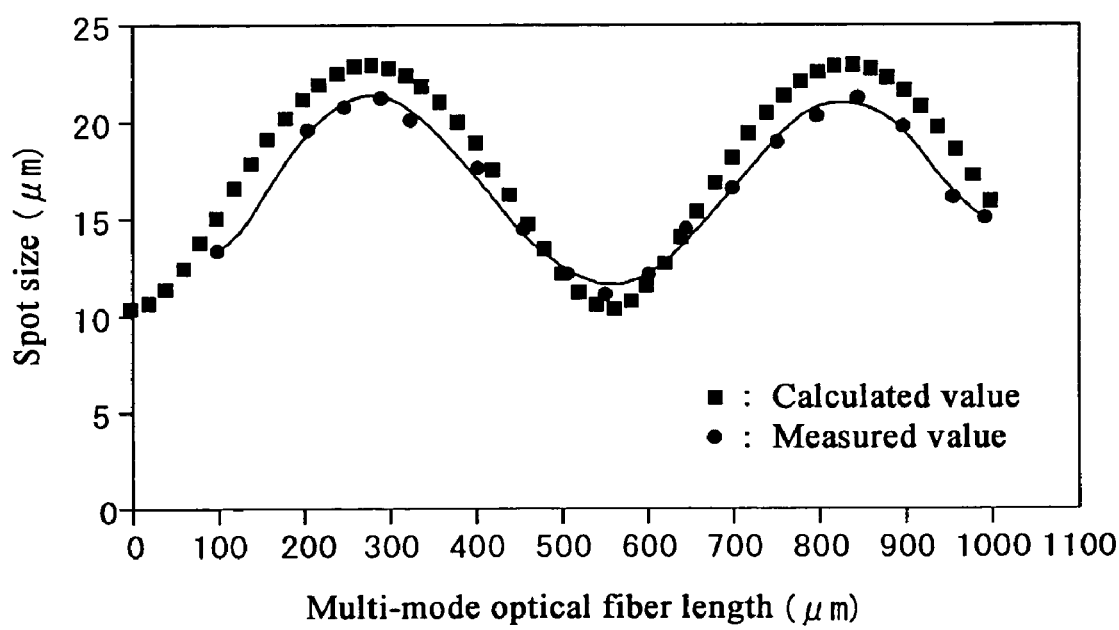
FIG. 2 is a diagram showing the results obtained by measuring the relation between the beam spot size at the flat cut end face at the tip of a multi-mode optical fiber coupled to a tip of a single-mode optical fiber, and the length of the multi-mode optical fiber.

In this connection, any of multi-mode optical fibers (core diameter 50 μm, clad diameter 125 μm) with various lengths was fusion-coupled to a tip of a single-mode optical fiber 1 (core diameter 8.3 μm, clad diameter 125 μm, SMF-28 produced by Coning), and the tip of the multi-mode optical fiber was cut to be flat. The relation between the spot size of the end face and the length of the multi-mode optical fiber was measured. The results of the measurement are shown in FIG. 2. The wavelength of the light used for measurement was 1.55 μm. FIG. 2 shows both measured values and calculated values.

According to the results of measurement shown in FIG. 2, the measured ¼ length of the meandering period of the beam and the calculated one were 280 μm, being virtually the same. The measured spot size in this case was 22/2=11 μm, and the calculated value was 23/2=11.5 μm. Therefore, it was confirmed that the spot size of the single-mode optical fiber 1 (5.2 μm) was expanded to 11 μm (measured value) at the tip.

Next, the relation between the spot size and the focal distance in the case where an aberration-free lens was used to condense a beam having a Gaussian distribution (hereinafter called a Gaussian beam) is discussed below.

The spot size $\omega_0'$ obtained when the spot size $\omega_0$ of a Gaussian beam incident on a lens is image-converted using one lens can be calculated from the following equation, as developed by Self [S. A. Self, "Focusing of Spherical Gaussian Beams," Appl. Opt.22, no.5 (March 1983): 658]

$$\omega_0'/\omega_0=1/\sqrt{\{[1-(s/f)]^2+(Zr/f)^2\}} \quad (1)$$

$$Zr=\pi\omega_0^2/\lambda$$

where s: image distance, f: focal distance of the lens, λ: wavelength

If an arrangement in which the spot of a beam expanded by a multi-mode optical fiber falls on the principal plain of a lens is assumed, we have s=0. So, the equation (1) can be simplified.

A case of calculation using the simplified equation (1) is shown below. In the case where a beam with λ=1.55 μm and incident spot size $\omega_0$=5.2 μm is image-converted using a lens with focal distance f=35 μm obtained by adjusting the radius of curvature, the spot size at the focal position is $\omega_0'$=2.8 μm.

Therefore, it can be seen that if the ideal spot size not containing any aberration calculated from the equation (1) is compared with a measured spot size, the magnitude of the aberration of the lens used for measurement can be estimated. Furthermore, it can be seen from the equation (1) that if the focal distance of the lens is changed, the spot size can be changed.

Figure 3:
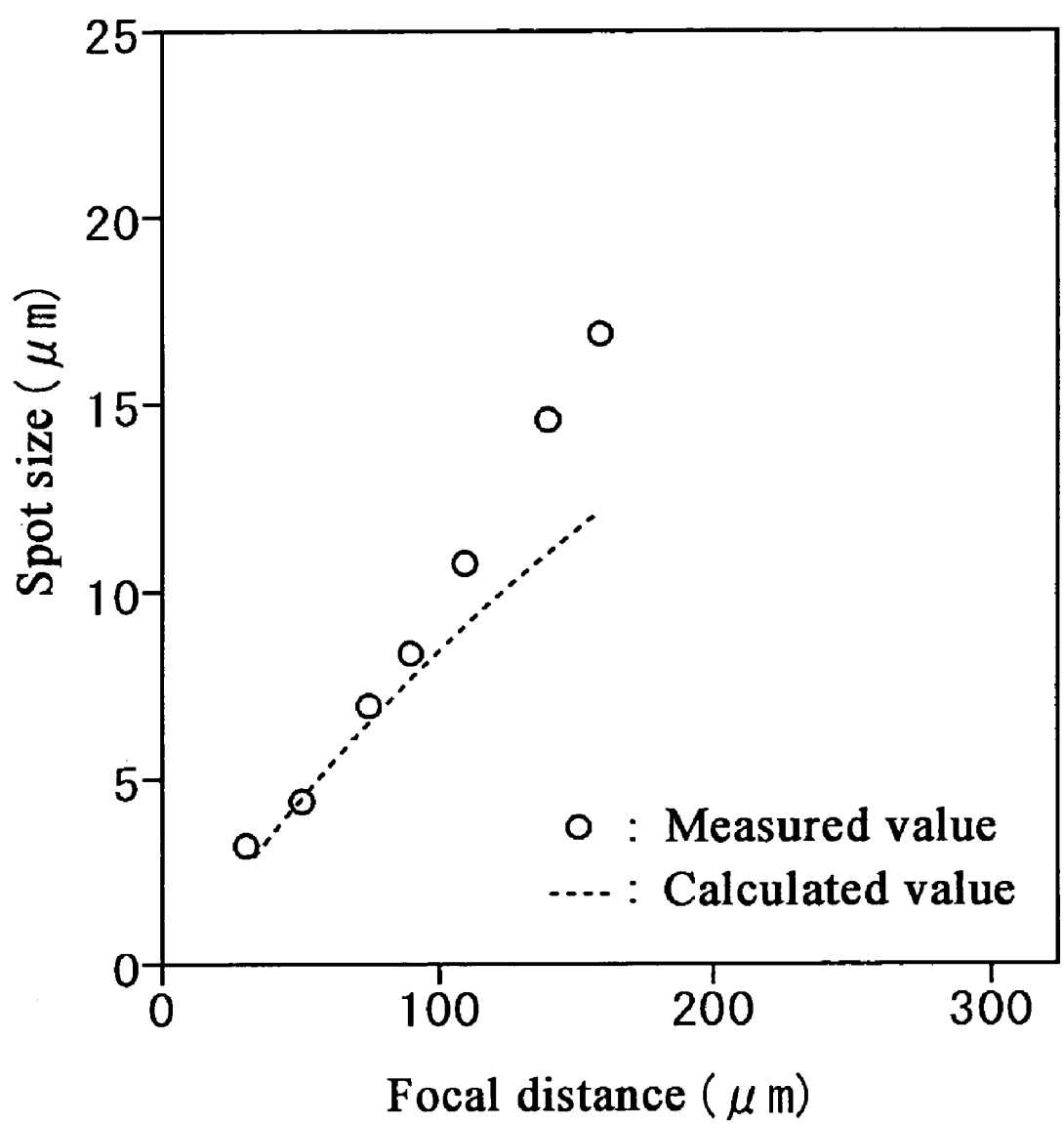
FIG. 3 is a diagram showing the results obtained by measuring the relation between the beam spot size and the focal distance obtained by changing the radius of curvature of the spherical portion.

A multi-mode optical fiber 2 with a core diameter of 50 μm, a clad diameter of 125 μm and a length Lgif of 280 μm (¼ length) was worked at a tip to form a spherical portion 3 at the tip, and the radius of curvature R was changed to change the focal distance. In this case, how the beam spot size changed was measured. The results are shown in FIG. 3. FIG. 3 shows both measured values and calculated values.

According to FIG. 3, the measured beam spot sizes were almost equal to the calculated values in a focal distance range of 90 μm or less. Therefore, it was confirmed that said multi-mode optical fiber 2 worked at a tip to form a spherical portion 3 at the tip had a lens with a small aberration. Such a relationship between the beam spot size and the radius of curvature was confirmed to apply also to multi-mode optical fibers with a core diameter of up to 85 μm based on other measurements.

From the above, it can be seen that presently widely distributed multi-mode optical fibers with a core diameter of 50 μm and a clad diameter of 125 μm and multi-mode optical fibers with a core diameter of 65 μm and a clad diameter of 125 μm can be used as optimum multi-mode optical fibers 2 applicable to this invention in view of availability and cost.

Figure 4:
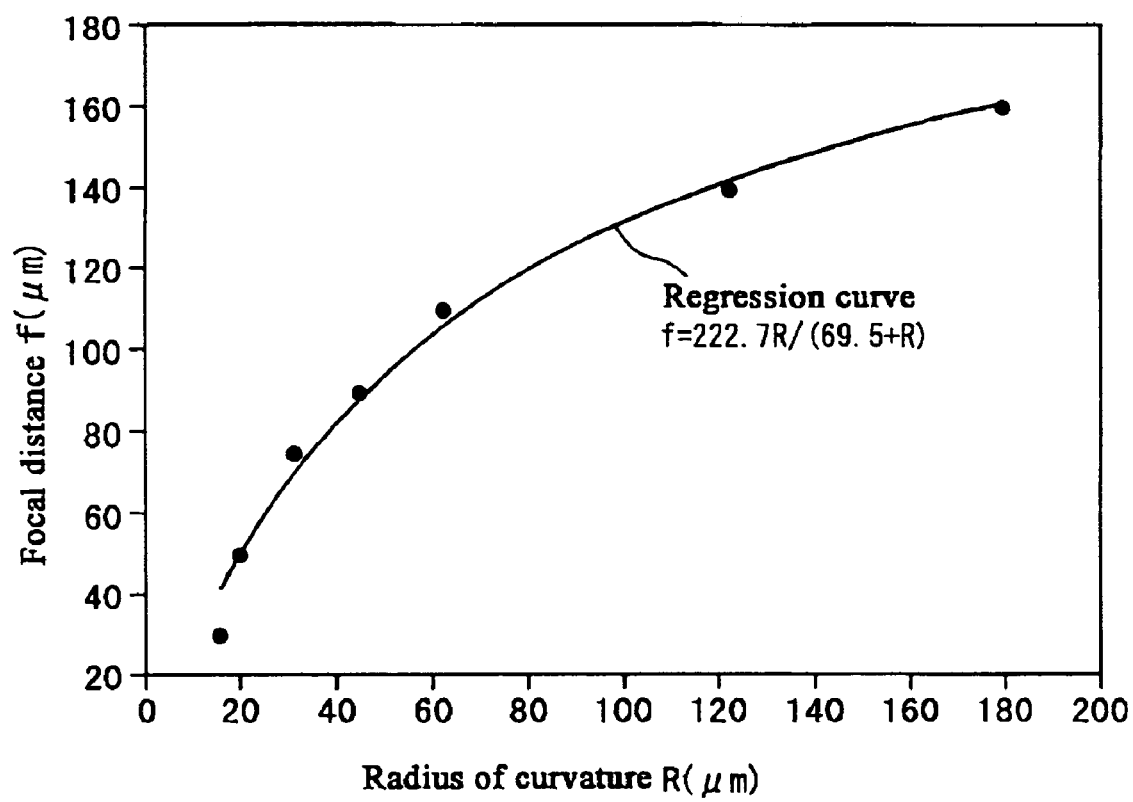
FIG. 4 is a diagram showing the results obtained by measuring the relation between the radius of curvature at the tip of a lens formed at the tip of a multi-mode optical fiber and the focal distance of the lens.

So, for a multi-mode optical fiber 2 with a core diameter of 50 μm and a clad diameter of 125 μm, the relation between the radius of curvature R at the tip of the lens and the focal distance f was measured. The results are shown in FIG. 4. In this measurement, the length of the multi-mode optical fiber 2 worked at a tip to form a spherical portion 3 at the tip was kept constant, and the radius of curvature R of the spherical portion 3 at the tip was changed to measure the focal distance f, for examining the relation between the radius of curvature and the focal distance. In FIG. 4, closed circles indicate measured values, and a solid line indicates a regression curve.

The measured values in the above measurement were regression-analyzed, and as a result, it was found that there is a correlation expressed by the following equation between the radius of curvature R of the spherical portion and the focal distance f as indicated by the solid line in the diagram.

$$f=222.7 \times R/(69.5+R) \quad (2)$$

From the equations (1) and (2) described above, it can be seen that if the spot size of the beam incident on the multi-mode optical fiber 2 is $\omega_0$, the radius of curvature R of the spherical portion 3 necessary for obtaining the beam spot size $\omega_0'$ at the focal position can be obtained from the following equations.

$$R=69.5f/(222.7-f)$$

$$f=\pi\omega_0^2/\sqrt{\{(\omega_0/\omega_0')^2-1\}} \quad (3)$$

where $\omega_0$: spot size of the beam incident on the multi-mode optical fiber 2, $\omega_0'$: spot size intended at the focal position, R: radius of curvature of the spherical portion 3

After the multi-mode optical fiber 2 has been worked at the tip to form the spherical portion 3 at the tip as described above, the condition for minimizing the spot size of the beam, i.e., the length Lgif of the multi-mode optical fiber 2 for minimizing the aberration can be obtained according to the following method.

As shown in FIG. 1, the length Lgif of the multi-mode optical fiber 2 refers to the length from the fusion-coupled face with the single-model optical fiber 1 to the most projected part of the spherical portion. How the beam spot size changed when the length Lgif was changed was measured with the radius of curvature R of the spherical portion 3 kept constant, i.e., using the radius of curvature R as a parameter.

Figure 5:
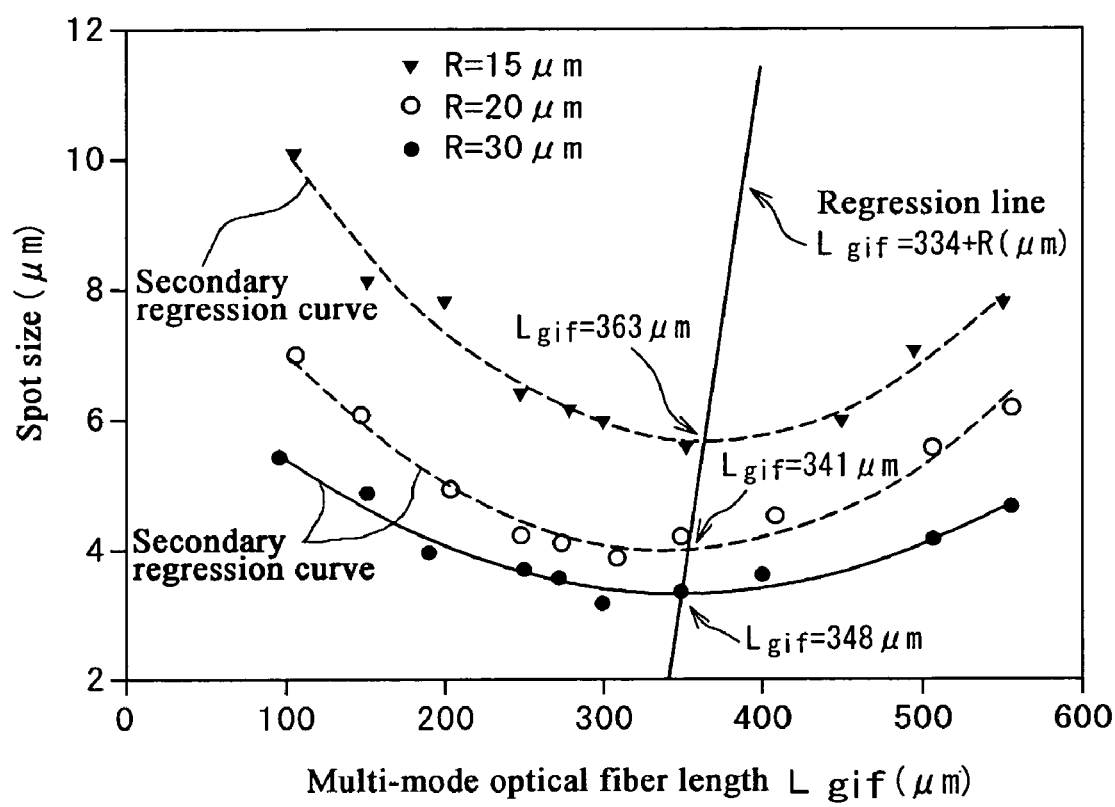
FIG. 5 is a diagram showing the results obtained by measuring the relation between the beam spot size and the multi-mode optical fiber length, using the radius of curvature R of the spherical portion as a parameter.

The results of the measurement are shown in FIG. 5. At each radius of curvature R, the length Lgif of the multi-mode optical fiber 2 at which the spot size becomes minimum is the length at which the aberration is small. So, if the length Lgif at which the aberration becomes minimum is obtained at each radius of curvature R, the length Lgif of the multi-mode optical fiber 2 at which the smallest spot size can be obtained depends on the radius of curvature R of the lens, as indicated by the solid line in FIG. 5. It was found that the relation could be expressed by the following equation.

$$Lgif=334+R(\mu m) \quad (4)$$

Therefore, it can be seen that if the equation (4) is used, the length of the multi-mode optical fiber 2 with the smallest aberration for a certain radius of curvature R of the spherical portion 3 can be obtained.

Now, the relation between the radius of curvature R of the spherical portion 3 at the tip of the multi-mode optical fiber 2 and the beam spot size $\omega$ is discussed below.

First of all, in the case where the multi-mode optical fiber 2 is worked at a tip to form the spherical portion 3 at the tip, it can be seen as a matter of course by intuition that in order that the image conversion by the spherical portion 3 can be from a normal (Gaussian) distribution to a normal (Gaussian) distribution, at first, the radius of curvature R of the spherical portion must be larger than the spot size at the position corresponding to the ¼ length of the meandering period at which the beam propagating in the multi-mode optical fiber 2 becomes most widened due to meandering.

So, multi-mode optical fibers 2 respectively with a different spherical portion 3 formed, having a core diameter of 50 μm and a clad diameter of 125 μm, were used, and when the spot size of the beam propagating in each optical fiber at the position corresponding to the ¼ length was kept at $\omega=11$ μm as measured before, the beam intensity distributions at the focal position were measured with the respective optical fibers different in the radius of curvature R of the spherical portion 3. The results are shown in FIG. 6.

Figure 6:
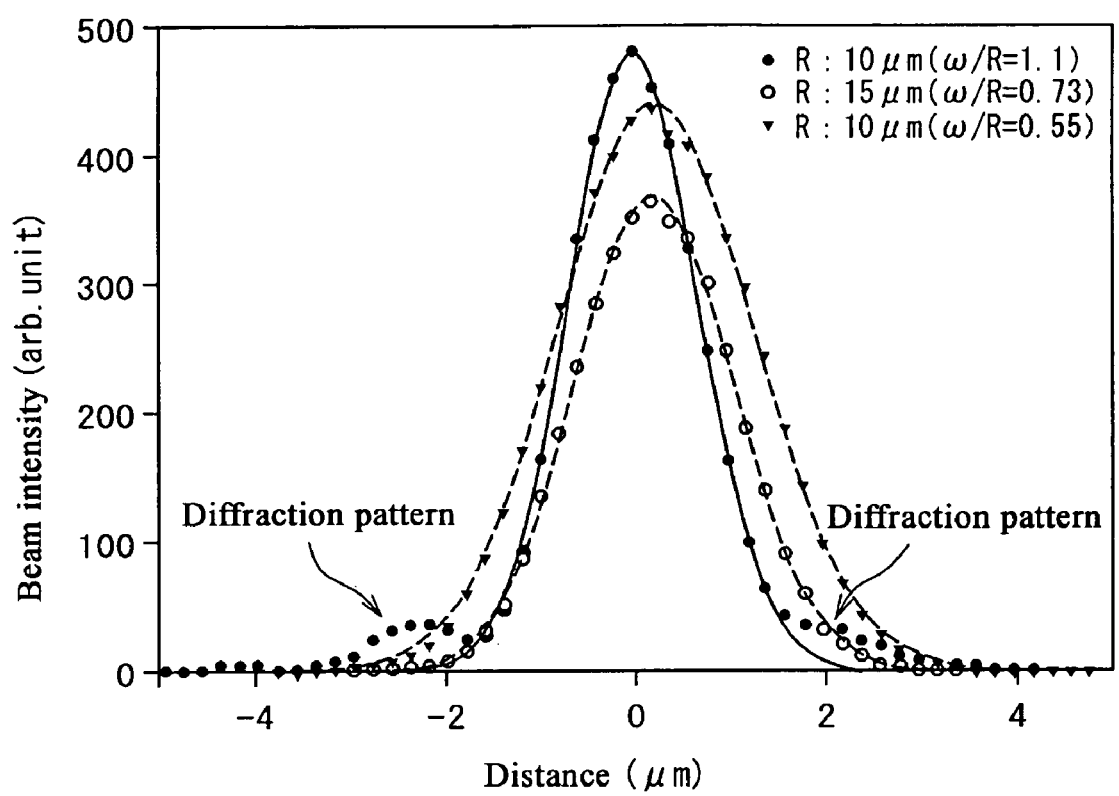
FIG. 6 is a diagram showing the results obtained by measuring the relation between the beam intensity distribution and the focal position, using the radius of curvature of the spherical portion as a parameter.

As shown in FIG. 6, in the case where the radius of curvature (R=10 μm is smaller than the spot size $\omega=11$ μm) ($\omega/R=1.1$), a diffraction pattern occurs in the beam intensity distribution at the focal position, and it can be seen that a normal (Gaussian) distribution cannot be obtained in such a case. On the other hand, it can be seen that in the case where the radius of curvature R=15 μm ($\omega/R=0.73$) or R=20 μm ($\omega/R=0.55$), is larger than the spot size $\omega=11$ μm, no diffraction pattern occurs, and that a normal (Gaussian) distribution can be obtained.

Therefore, in the case where a multi-mode optical fiber 2 with a core diameter of 50 μm and a clad diameter of 125 μm is used, the radius of curvature of the spherical portion must be set at a value larger than 11 μm for satisfying said important matter (1), i.e., for satisfying the constitution that the beam intensity distribution at the focal position (beam waist) of the beam condensed by the optical fiber with a lens becomes as close to a Gaussian distribution as possible.

However, as described before, when the spot size $\omega_0$ of the beam incident on the multi-mode optical fiber 2 is, since the radius of curvature R of the spherical portion 3 necessary to obtain the beam spot size $\omega_0'$ at the focal position can be obtained from the aforesaid equation (3), the radius of curvature of the spherical portion 3 can be decided as the logical product of them.

INDUSTRIAL APPLICABILITY

The present invention as described above has such special advantages that when an optical fiber such as a single-mode optical fiber or polarization maintaining optical fiber is coupled to an optical device such as a semiconductor laser or to another optical fiber, a high coupling efficiency can be obtained, and that if the working distance is elongated, the damage or the like, for example, in aligning work can be prevented.

What is claimed is:

1. An optical fiber with a lens, which is obtained by fusion-coupling a multi-mode optical fiber to a tip of a single-mode optical fiber, and working a tip of the multi-mode optical fiber, to form a spherical portion at the tip, and in which a radius of curvature of the spherical portion is set at a value larger than a maximum value of a spot size of a beam irradiating at a given distance from the single-mode optical fiber magnified by the multi-mode optical fiber, wherein the multi-mode optical fiber has a core diameter of 50 μm and a clad diameter of 125 μm; and a radius of curvature of the spherical portion is set based on the following correlation with a spot size of a beam incident on the multi-mode optical fiber and a spot size intended at a focal position:

$R = 69.5 f/(222.7 - f)$ $f = \pi \omega_0^2 / \sqrt{\{(\omega_0/\omega_0')^2 - 1\}}$ where $\omega_0$ is spot size of the beam incident on the multi-mode optical fiber, $\omega_0'$ is spot size intended at the focal position, and R is radius of curvature of the spherical portion (μm); and f is a focal distance (μm).

2. An optical fiber with a lens, which is obtained by fusion-coupling a multi-mode optical fiber to a tip of a polarization maintaining optical fiber, and working a tip of the multi-mode optical fiber, to form a spherical portion at the tip, and in which a radius of curvature of the spherical portion is set at a value larger than a maximum value of a spot size of a beam irradiating at a given distance from the polarization maintaining optical fiber magnified by the multi-mode optical fiber, wherein the multi-mode optical fiber has a core diameter of 50 μm and a clad diameter of 125 μm; and a radius of curvature of the spherical portion is set based on the following correlation with a spot size of a beam incident on the multi-mode optical fiber and a spot size intended at a focal position:

$R = 69.5 f/(222.7 - f)$ $f = \pi \omega_0^2 / \sqrt{\{(\omega_0/\omega_0')^2 - 1\}}$ where $\omega_0$ is spot size of the beam incident on the multi-mode optical fiber, $\omega_0'$ is spot size intended at the focal position, and R is radius of curvature of the spherical portion (μm); and f is a focal distance (μm).

3. An optical fiber with a lens, which is obtained by fusion-coupling a multi-mode optical fiber to a tip of a single-mode optical fiber, and working a tip of the multi-mode optical fiber, to form a spherical portion at a tip, and in which a radius of curvature of the spherical portion is set at a value larger than a maximum value of a spot size of a beam irradiating at a given distance from the single-mode optical fiber magnified by the multi-mode optical fiber, wherein the multi-mode optical fiber has a core diameter of 50 μm and a clad diameter of 125 μm; a radius of curvature of the spherical portion is set based on the following correlation with a spot size of a beam incident on the multi-mode optical fiber and a spot size intended at a focal position:

$R = 69.5 f/(222.7 - f)$ $f = \pi \omega_0^2 / \sqrt{\{(\omega_0/\omega_0')^2 - 1\}}$ where $\omega_0$ is spot size of the beam incident on the multi-mode optical fiber, $\omega_0'$ is spot size intended at the focal position, and R is radius of curvature of the spherical portion (μm); and f is a focal distance (μm); and a length of the multi-mode optical fiber is set based on the following correlation:

$Lgif = 334 + R$ where Lgif is length of the multi-mode optical fiber (μm), and R is radius of curvature (μm).

4. An optical fiber with a lens, which is obtained by fusion-coupling a multi-mode optical fiber to a tip of a polarization maintaining optical fiber, and working a tip of the multi-mode optical fiber, to form a spherical portion at a tip, and in which a radius of curvature of the spherical portion is set at a value larger than a maximum value of a spot size of a beam irradiating at a given distance from the polarization maintaining optical fiber magnified by the multi-mode optical fiber, wherein the multi-mode optical fiber has a core diameter of 50 μm and a clad diameter of 125 μm; and a radius of curvature of the spherical portion is set based on the following correlation with a spot size of a beam incident on the multi-mode optical fiber and a spot size intended at a focal position:

$R = 69.5 f/(222.7 - f)$ $f = \pi \omega_0^2 / \sqrt{\{(\omega_0/\omega_0')^2 - 1\}}$ where $\omega_0$ is spot size of the beam incident on the multi-mode optical fiber, $\omega_0'$ is spot size intended at the focal position, and R is radius of curvature of the spherical portion; (μm); and f is the focal distance (μm); and a length of the multi-mode optical fiber is set based on the following correlation:

$Lgif = 334 + R$ where Lgif is length of the multi-mode optical fiber (μm), and R is radius of curvature (μm).

5. An optical fiber with a lens, according to claim 1, wherein the length of the multi-mode optical fiber is set based on the correlation depending on said length and said radius of curvature, for obtaining the minimum spot size at the focal position.

6. An optical fiber with a lens, according to claim 5, wherein the correlation is derived from the data of the spot size at the focal position measured by changing the length at each radius of curvature, using the radius of curvature as a parameter.

7. An optical fiber with a lens, according to claim 2, wherein the length of the multi-mode optical fiber is set based on the correlation depending on said length and said radius of curvature, for obtaining the minimum spot size at the focal position.

8. An optical fiber with a lens, according to claim 7, wherein the correlation is derived from the data of the spot size at the focal position measured by changing the length at each radius of curvature, using the radius of curvature as a parameter.

9. An optical fiber with a lens, according to claim 3, wherein the length of the multi-mode optical fiber is set based on the correlation depending on said length and said radius of curvature, for obtaining the minimum spot size at the focal position.

10. An optical fiber with a lens, according to claim 9, wherein the correlation is derived from the data of the spot size at the focal position measured by changing the length at each radius of curvature, using the radius of curvature as a parameter.

11. An optical fiber with a lens, according to claim 4, wherein the length of the multi-mode optical fiber is set based on the correlation depending on said length and said radius of curvature for obtaining the minimum spot size at the focal position.

12. An optical fiber with a lens, according to claim 11, wherein the correlation is derived from the data of the spot size at the focal position measured by changing the length at each radius of curvature using the radius of curvature as a parameter.

* * * * *